US008788802B2

(12) United States Patent  (10) Patent No.: US 8,788,802 B2
Gantman et al.  (45) Date of Patent: Jul. 22, 2014

(54) CONSTRAINED CRYPTOGRAPHIC KEYS

(75) Inventors: Alexander Gantman, Poway, CA (US);
Tolga Yalcinkaya, San Diego, CA (US);
Gregory Gordon Rose, San Diego, CA (US);
Lu Xiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 954 days.

(21) Appl. No.: 11/535,937

(22) Filed: Sep. 27, 2006

(65)  Prior Publication Data
US 2008/0037785 A1  Feb. 14, 2008

Related U.S. Application Data

(60) Provisional application No. 60/722,185, filed on Sep. 29, 2005, provisional application No. 60/761,476, filed on Jan. 24, 2006.

(51) Int. Cl.
H04L 29/06 (2006.01)
H04L 9/08 (2006.01)
H04L 9/32 (2006.01)

(52) U.S. Cl.
CPC .............. *H04L 9/0872* (2013.01); *H04L 9/088* (2013.01); *H04L 63/083* (2013.01); *H04L 2209/76* (2013.01); *H04L 9/321* (2013.01)
USPC ............................... 713/150; 713/168; 380/44

(58) Field of Classification Search
USPC ........................... 380/44; 713/153, 168, 170
See application file for complete search history.

(56)  References Cited

U.S. PATENT DOCUMENTS 6,052,784 A * 4/2000 Day ................................ 726/22
2002/0023214 A1* 2/2002 Shear et al. ................... 713/170

(Continued)

FOREIGN PATENT DOCUMENTS

GB  2382501  5/2003
JP  2001134534 A  5/2001

(Continued)

OTHER PUBLICATIONS

Tie-Yan Li, "Time Constraint Delegation for P2P Data Decryption", 2004, Springer-Verlag Berlin Heidelberg, pp. 173-186.*

(Continued)

*Primary Examiner* — Edward Zee
*Assistant Examiner* — Chi Nguy
(74) *Attorney, Agent, or Firm* — Won Tae Kim

(57)  ABSTRACT

A constrained proxy key is used to secure communications between two devices via an intermediary device. A first proxy key is generated at a host device (key generator device) based on a shared secret key, one or more constraints on the first proxy key, and a key derivation function. At least the shared secret key and key derivation function are known to the host device an a client device (authentication device). The first proxy key is sent to a proxy device to use in authenticating communications with the client device. An authenticated message is generated by the proxy device using the first proxy key and sent to the client device. The client device locally generates a second proxy key using the key derivation function, one or more constraints, and the shared secret key for authenticating the proxy device. The proxy device is authenticated if the client device successfully accesses the authenticated message from the proxy device using the second proxy key.

59 Claims, 11 Drawing Sheets

(56) References Cited

U.S. PATENT DOCUMENTS

| | | | |
|---|---|---|---|
| 2002/0025046 A1 | 2/2002 | Lin | |
| 2003/0046542 A1* | 3/2003 | Chen et al. | 713/176 |
| 2004/0025019 A1* | 2/2004 | Watanabe et al. | 713/168 |
| 2005/0182938 A1* | 8/2005 | Seshadri et al. | 713/176 |
| 2005/0190911 A1* | 9/2005 | Pare et al. | 380/30 |
| 2006/0101288 A1* | 5/2006 | Smeets et al. | 713/194 |
| 2006/0291483 A1* | 12/2006 | Sela | 370/401 |

FOREIGN PATENT DOCUMENTS

| | | |
|---|---|---|
| JP | 2003179592 A | 6/2003 |
| JP | 2003209546 A | 7/2003 |
| JP | 2003304252 A | 10/2003 |
| JP | 2004015241 A | 1/2004 |
| JP | 2004142848 A | 5/2004 |
| JP | 2004166238 A | 6/2004 |
| JP | 2005210285 A | 8/2005 |
| JP | 2006246081 A | 9/2006 |
| TW | 1224455 | 11/2004 |
| WO | 2004040397 A2 | 5/2004 |

OTHER PUBLICATIONS

International Search Report—PCT/US06/038110—International Search Authority, European Patent Office—Oct. 1, 2008.

Written Opinion—PCT/US06/038110—International Search Authority, European Patent Office—Oct. 1, 2008.

Taiwanese Search report—095136263—TIPO—Jul. 12, 2010.

\* cited by examiner

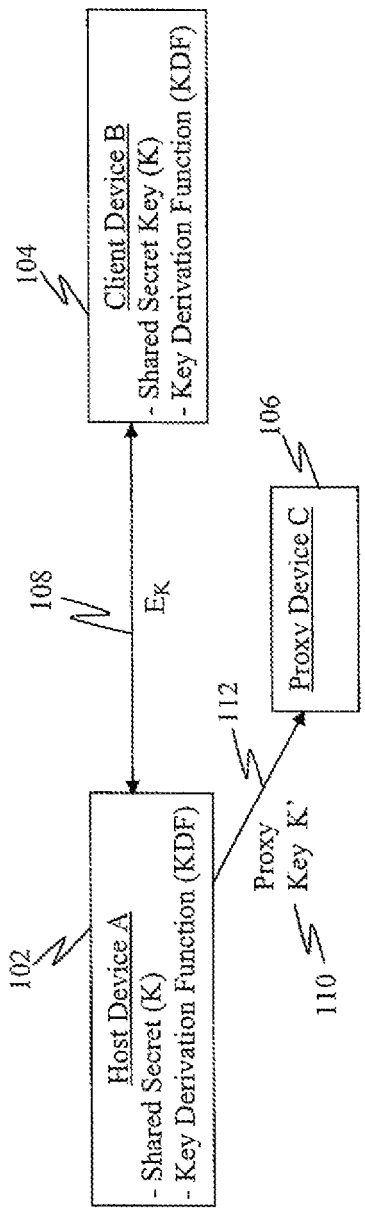
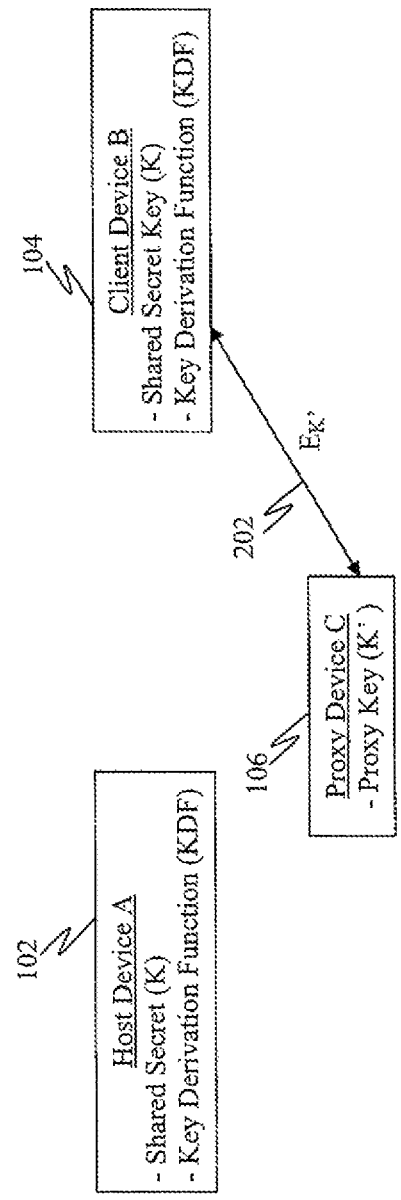
Figure 1
Figure 2

CONSTRAINED CRYPTOGRAPHIC KEYS

CLAIM OF PRIORITY UNDER 35 U.S.C. §119

The present application for patent claims priority to U.S. Provisional Application No. 60/722,185 entitled "Constrained Cryptographic Keys" filed Sep. 29, 2005 and U.S. Provisional Application No. 60/761,476 entitled "Authentication By Proxy" filed Jan. 24, 2006, both provisional applications assigned to the assignee hereof and hereby expressly incorporated by reference herein.

BACKGROUND

1. Field

Various embodiments pertain to secure communications and, in particular, to constrained cryptographic keys that enable secure communications between two parties via a proxy device.

2. Background

Currently, secured communications between two parties is often accomplished by use of a shared secret. This shared secret allows the two parties to keep the content of their communications (e.g., data packets, messages, etc.) private by using encryption based on the shared secret. Additionally, the shared secret allows a party to authenticate that a communication indeed came from a claimed sender and was not modified in transit.

In some situations, a direct and secure communication link cannot be established between two parties. For example, when a secure communication link between a first device and second device is lost or severed, a third device may need to troubleshoot or service the second device. To communicate with the second device, the third device (e.g., field technician, etc.) would need to establish a secure link with the second device.

In applications where public-key cryptography (asymmetric key cryptography) is used between a first party and second party, certificate hierarchies are often used to solve this problem via a third party acting as a proxy between the first party and second party. The first party can issue a proxy certificate to the third party (typically by digitally signing the third party's public key with the first party's private key) that enables the third party to act as a proxy for the first party. This third party can then present its public key along with the proxy certificate to the second party.

However, asymmetric key cryptography algorithms are relatively computationally costly in comparison to other cryptographic methods. Additionally, once a proxy certificate is issued to a third party, it is difficult to limit what type of information the third party may receive or access from the second party or how long the third party may act as a proxy for the first party. Thus, a proxy key cryptographic algorithm is needed that is computationally efficient and allows a proxy generator to apply constraints to the proxy key.

SUMMARY

A method is provided for enabling secure communications between a client device and a proxy device. A first proxy key is generated at a host device based on a shared secret key known to the host device and the client device. The first proxy key is sent to the proxy device. Distribution of an authentication algorithm may be pre-arranged between the host device and the client device. Likewise, distribution of the secret key between the host device and the client device may also be pre-arranged. The proxy device may be authenticated when the first and second proxy keys are the same.

The first proxy key and the second proxy key may be independently generated using a key derivation function (KDF) and the shared secret key. The KDF takes as input one or more constraints and the shared secret key to obtain the first proxy key and second proxy key. The shared secret key can only be recovered with knowledge of the first proxy key, the one or more constraints, and the KDF.

The method may further include selecting one or more constraints associated with the first proxy key at the host device, wherein the first proxy key and second proxy key are based on the one or more constraints. The one or more constraints may be sent from the proxy device to the client device, wherein the client device applies the constraints in the first proxy key. Alternatively, the one or more constraints are sent from the host device to the client device, wherein the client device applies the constraints to the second proxy key.

An indicator may be set in a message sent from the proxy device to the client device to indicate to the client device that a proxy key is being used to secure the message. The one or more constraints that are used to derive the first proxy key may be defined at the host device and conveyed to the client devise. The operation of the client device may be restricted with relation to the proxy device according tot he one or more constraints.

Another method is provided for generating a proxy key on a host device. A shared secret key is obtained and used for securing communications with a client device having the same shared secret key. A first key derivation function is also obtained, wherein the first key derivation function is related to a second key derivation function known to the client device. A proxy key is generated based on the first key derivation function and the shared secret key. The proxy key is provided to a proxy device, wherein the proxy device can use the proxy key to authenticate communications with the client device. One or more constraints on the proxy key may be defined prior to generating the proxy key. These constraints are used to generate the proxy key and sent to the proxy device. The one or more constraints are sent to the client device. Generating the proxy key includes using one or more constraints as parameters to the first key derivation function along with the shared secret key to obtain the proxy key.

The shared secret key may used in a symmetric key security scheme between the host device and the client device. The first key derivation function may be an encryption block cipher.

The method also includes storing a plurality of cryptographic functions and selecting the first key derivation function from among the plurality of cryptographic functions. A data may be transmitted designating one of a plurality of key derivations functions. The one or more constraints may include timestamps indicating a period during which the proxy key is valid.

A key generator host device is also provided including (a) a communication interface for communicating with other devices; (b) a storage device for storing a shared secret key and key derivation function, wherein the shared secret key and key derivation function are both known to a client device; and/or (c) a processing circuit coupled to the communication interface and the storage device. The processing circuit may be configured to (1) generate a proxy key based on the key derivation function and shared secret key, and/or (2) send the proxy key to a proxy device, wherein the proxy device can use the proxy key to authenticate communications with the client device. The processing circuit may be further configured to define one or more constraints on the proxy key prior to generating the proxy key. The proxy key may be generated based on the one or more constraints. The constraints may be pre-arranged with the client device and/or sent to the proxy device. The one of the constraints may cause the proxy key to expire after an amount of time.

The key derivation function may be an encryption block cipher. The storage device stores a plurality of cryptographic functions and the processing circuit is configured to select the key derivation function from among the plurality of cryptographic functions. The processing circuit may be further configured to transmit a data designating the selected key derivation function from the plurality of cryptographic functions used to incorporate one or more constraints into the proxy key.

A proxy generation device is also provided comprising: (a) means for obtaining a shared secret key used for secure communications with a client device having the same shared secret key; (b) means for obtaining a key derivation function, wherein the key derivation functions is also known to the client device; (c) means for generating a proxy key based on the key derivation function and the shared secret key; and/or (d) means for sending the proxy key to a proxy device, wherein the proxy device can use the proxy key to authenticate communications with the client device.

A processor is also provided configured to generate a proxy key on a host device, comprising a processing circuit configured to: (a) obtain a shared secret key used for secure communications with a client device having the same shared secret key; (b) obtain a key derivation function, wherein the key derivation function is related to a second key derivation function known to the client device, (c) generate the proxy key based on the key derivation function and the shared secret key, and (d) provide the proxy key to a proxy device. The processing circuit may be further configured to (e) define one or more constraints on the proxy key prior to generating the proxy key, (f) generate the proxy key based on the one or more constraints, and/or (g) provide the one or more constraints to the client device.

A machine-readable medium is provided having one or more instructions for generating a proxy key at a host device, which when executed by a processor causes the processor to: (a) obtain a shared secret key used for secure communications with a client device having the same shared secret key; (b) obtain a key derivation function, wherein the key derivation function is related to a second key derivation function known to the client device; (c) generate the proxy key based on the key derivation function and the shared secret key; and (d) provide the proxy key to a proxy device. The machine-readable medium may further include one or more instructions which when executed by a processor causes the processor to: (e) define one or more constraints on the proxy key; (f) generate the proxy key based on the one or more constraints; and/or (g) provide the one or more constraints to the client device.

A method operational on a proxy device is provided, comprising: (a) obtaining a proxy key from a host device; (b) storing the proxy key for use with a client device with which the host device has shared a key derivation function and a secret key; (c) authenticating a message with the proxy key; and/or (d) sending the authenticated message to the client device to authenticate the proxy device to the client device. The method may also include (e) receiving an authenticated message from the client device; and/or (f) authenticating the client device by using the proxy key to authenticate the message from the client device. In one implementation, one or more constraints imposed by the host device on the proxy key are obtained sent to the client device. The proxy key may be generated based on the one or more constraints. An indicator may also be sent to the client device indicating that the authenticated message is authenticated using a proxy key. A data may also be transmitted to the client device designating a key derivation function used to generate the proxy key.

A proxy device is also provided comprising: (a) a communication interface for communicating with a host device and a client device; (b) a storage device; and/or (c) a processing circuit coupled to the communication interface and the storage device. The processing circuit may be configured to (1) obtain a proxy key from the host device, 2) store the proxy key in the storage device for use with the client device, wherein the host device and client device share a key derivation function and a secret key, (3) authenticate a message using the proxy key, and/or (4) send the authenticated message to the client device to authenticate the proxy device to the client device.

Another proxy device is provided comprising: (a) means for obtaining a proxy key from a host device; (b) means for storing the proxy key for use with a client device with which the host device has shared a key derivation function and a secret key; means for authenticating a message with the proxy key; (c) means for sending the authenticated message to the client device to authenticate the proxy device to the client device; (d) means for obtaining one or more constraints imposed by the host device on the proxy key; and/or (e) means for sending the one or more constraints to the client device.

A method operational on a client device is provided for authenticating a proxy device. A shared secret key known to both a host device and the client device is obtained. A key derivation function known to both the client device and the host device is also obtained. An authenticated message is received at the client device from a proxy device. A local proxy key is generated using the key derivation function and the shared secret key. The proxy device is authenticated at the client device by using the local proxy key. One or more constraints are obtained and operations that can be performed by the proxy device are restricted according to constraints. The proxy device is authenticated by the client device if the local proxy key successfully decrypts the secured message.

A key authentication client device is also provided, comprising: (a) a communication interface for communicating with a proxy device; (b) a storage device for storing a shared secret key and a key derivation function, wherein the shared secret key and key derivation function are both known to a host device; and/or (c) a processing circuit coupled to the communication interface and the storage device. The processing circuit may be configured to (1) receive a secure message from the proxy device, (2) generate a local proxy key using the key derivation function and the shared secret key, (3) authenticate the proxy device by using the local proxy key, and/or (4) obtain one or more constraints on the proxy device, and/or restrict operations that can be performed by the proxy device according to the one or more constraints.

Another key authentication client device is also provided, comprising: (a) means for obtaining a shared secret key that can be used by a host device to authenticate communications with the client device having the same shared secret key; (b) means for obtaining a key derivation function known to both the host device and client device; (c) means for receiving an authenticated message at the client device from a proxy device; (d) means for generating a local proxy key using the key derivation function and the shared secret key; and/or (f) means for authenticating the proxy device by using the local proxy key. The device may further include (g) means for obtaining one or more constraints; (i) means for restricting operations that can be performed by the proxy device according to constraints.

A processor configured to authenticate a proxy device on a client device is provided, including a processing circuit configured to (1) obtain a shared secret key that can be used by a host device to authenticate communications with the client device having the same shared secret key; (2) obtain a key derivation function known to both the client device and host device; (3) receive an authenticated message at the client device from a proxy device; (4) generate a local proxy key using the key derivation function and the shared secret key; (5) authenticate the proxy device at the client device by using the local proxy key; (6) obtain one or more constraints on the proxy device; (7) generate the local proxy key based on the one or more constraints; and/or (8) restrict operation of the proxy device with relation to the client device based on the one or more constraints.

A machine-readable medium is also provided having one or more instructions for authenticating a proxy device at a client device, which when executed by a processor causes the processor to: (a) obtain a shared secret key that can be used by a host device to authenticate communications with the client device having the same shared secret key; (b) obtain a key derivation function known to both the client device and host device; receive an authenticated message at the client device from a proxy device; (c) generate a local proxy key using the key derivation function and the shared secret key; (d) authenticating the proxy device at the client device by using the local proxy key; (e) obtain one or more constraints on the proxy key; (f) generate the proxy key based on the one or more constraints, and/or (g) restrict operation of the proxy device with relation to the client device based on the one or more constraints. The proxy device is authenticated if the received authenticated message is properly authenticated by using the local proxy key.

BRIEF DESCRIPTION OF THE DRAWINGS

FIGS. 1 and 2 illustrate a security scheme in which a proxy key can be generated and authenticated by separate devices.

DETAILED DESCRIPTION

Figure 3:
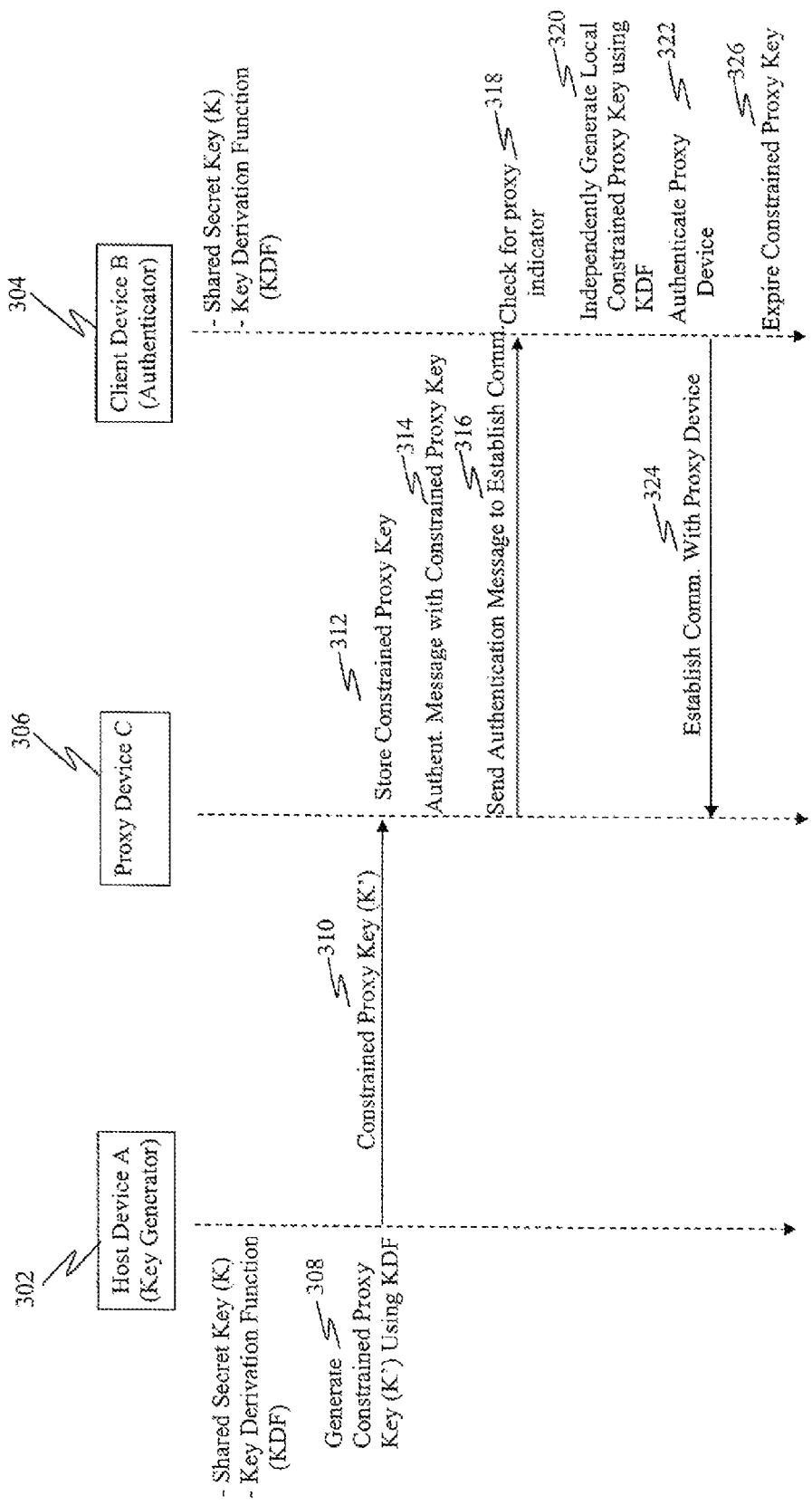
FIG. 3 illustrates a method for generating, distributing, and authenticating a secure and restricted proxy key.

In the following description, specific details are given to provide a thorough understanding of the embodiment. However, it will be understood by one of ordinary skill in the art that the embodiments maybe practiced without these specific details. For example, circuits may not be shown to block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to, portable or fixed storage devices, optical storage devices, wireless channels, and various other mediums capable of storing, containing, or carrying instruction(s) and/or data.

Furthermore, embodiments may be implemented by hardware, software, firmware, middleware, microcode, or a combination thereof. When implemented in software, firmware, middleware, or microcode, the program code or code segments to perform the necessary tasks may be stored in a machine-readable medium such as a storage medium or other storage means. A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information data, arguments, parameters, or memory contents. Information, arguments, parameters, data, and the like, may be passed, forwarded, or transmitted via a suitable means including memory sharing, message passing, token passing, and network transmission, among others.

In the following description, certain terminology is used to describe certain features of one or more embodiments. The term "key" (e.g., proxy key, secret key, constrained key, etc.) refers to a certificate, identifier, cryptograph, or other types of numeric, alpha-numeric, or symbols.

Other feature provides a symmetric key cryptography scheme in which a third party (proxy) is provided with a proxy key by a first party (host) that it can use to securely communicate with a second party (client). The proxy key may be constrained in its function and use. For example, a constrained proxy key may be limited to a particular time period during which the third party (proxy) may set as a proxy for the first party (host). In another example, the constrained proxy key may be limited to certain types of messages that the third party (proxy) may send. All communication between the third party (proxy) and second party (client) remain secure by the proxy key that is used for encryption and/or authentication. Furthermore, in one implementation, the proxy key includes sufficient information to convince the second party (client) that the third party (proxy) has been authorized by the first party (host). Finally, a secret key is known by the first party (host) and second party (client) and used to generate and authenticate the proxy key. However, the secret key is not known by the third party (proxy) which is not able to exceed the constraints placed on it by the first party (host).

FIGS. 1 and 2 illustrate a security scheme in which a proxy key can be generated and authenticated by separate devices. In one mode of operation, host device A 102 and client device B 104 establish a secure communication link 108 using a cryptographic key(s) (e.g., asymmetric or symmetric keys) where a shared secret key K is known by both host device A 102 and client device B 104. In some implementations, host device A 102 may control the operation of client device B 104 by commands sent over the secure communication link 108. The share secret key K may be associated with communications with client device B 104 and used for encrypting, securing and/or authenticating messages between host device A 102 and device B 104 over communication link 108. When communicating with other devices, host device A 102 may use different shared secret keys.

Occasionally, there may be instances in which a proxy device C 106 needs to communicate with device B 104. While the shared secret key K should not be revealed to device C 106, the communications between client device B 104 and proxy device C 106 should at least be secured and authenticated. For this purpose, host device A 102 may provide proxy device C 106 with a proxy key K' authorizing to communicate with device B 104. As illustrated in FIG. 2, when the secure communication link 108 between host device A 102 and client device B 104 is absent, as may be the case during an interruption of network service, proxy device C 106 may establish a second secure communication link 202 using the proxy key 110 from host device A 102. To give proxy device C106 access to client device B104 without revealing the secret key K, host device A 102 generates the proxy key K' from the secret key K and sends the proxy key k' to proxy device C 106 and device B 104. By presenting the proxy key k' to device B 102, device C 106 may, for example, control operations of device B 104. The second communication link 202 operates even if the first communication link 108 does not.

To restrict the control that proxy device C 106 may exert over client device B 104, cryptographic function, also referred to as key derivation function (KDF), is prearranged between devices A 102 and B 104. That is, a KDF can be used to derive proxy or constrained keys from their shared secret key (K). In some embodiments, devices A 102 and B 104 may pre-arrange a specific KDF. In other implementations, a plurality of such cryptographic functions is known to both device A 102 and device B 104. The KDF takes as input the shared secret K and any constraints to be imposed on the proxy or constrained key. When host device A 102 wishes to grant proxy device C 106 proxy powers, it generates a new proxy key (K') 110 using KDF (K) and delivers it to proxy device C 106. This proxy key K' 110 can now be used to secure and/or authenticate communications between client device B 104 and host device C 106.

In order to properly authenticate (e.g., decrypt) messages coming from proxy device C 106, client device B 104 is informed that a proxy key is being used. One way to achieve this is to use a one bit flag in every message to signal the use of a proxy key. Client device B 104 may use the KDF and its secret key K to generate a local version of proxy key K' which is then used to authenticate the authenticated message received from proxy device C 106. If the message is properly authenticated (e.g., decrypted, etc.), then proxy device C 106 is authenticated and secure communications can be performed between client device B 104 and proxy device C 106 using the proxy key K'.

In order for client device B 104 to independently generate the same proxy key as host device A 102, device B 104 must also know which constraints host device A 102 has placed on the proxy key K'. In one embodiment, a list of the constrains imposed on the proxy key K' by host device A 102 can accompany every message sent by proxy device C 106. In another embodiment, a concept of sessions can be introduced and a list of constrains can be sent by proxy device C 106 once per session (preferably at the beginning). In yet another embodiment, the constraints may be pre-arranged by host device A 102 and client device B 104 beforehand. For example, host device A 102 and client device B 104 may agree beforehand that the all proxy keys will be valid for exactly one day, e.g., midnight to midnight. In such cases, the constraint used as input to the KDF may be the date on which the proxy key is valid. Whenever client device B 104 receives a message authenticated or protected by a proxy key, it reconstructs the proxy key using the current date.

In one example, by using proxy device C 106, host device A 102 can delegate authority to proxy device C 106 while retaining control of the access privileges available to proxy device C 106. Moreover, as the generator of the proxy key K', host device A 102 may eavesdrop on or monitor communications by proxy device C 106.

In one embodiment, the cryptographic function or key derivation function may be a block cipher, where the shared secret K is sued as the key input and the proxy constraints (and/or other parameters) are used as the plaintext input to the block cipher. In one implementation, one or more bits are set in the proxy message (e.g., either n every message to the client device B 104 or at the beginning of each communication session with client device B 104) to indicate that a key is a proxy or constrained key. In another embodiment, the proxy bit can be omitted, in which case, for every received message client device B 104 tries to process it twice, one as if the bit is set and once as if it is not set, and selects the one version that passes authentication.

In other implementations, host device A 102 communicate with multiple other (wired or wireless) devices. In such cases, host device A 102 (e.g., a host device) stores a plurality of secret keys $K_i$, each secret key Ki corresponding to, and also stored in, one of a plurality of wired or wireless devices. Host device A 102 generates a proxy key $K_i'$ from the secret key $K_i$ corresponding to a first device $M_i$, and sends the proxy key $K_i'$ to a proxy device (e.g., proxy device C 106). The proxy key $K_i'$ may be used to encrypt and/or authenticate message between the proxy device and the first device $M_i$ (e.g., client device B 104). Similarly, there may be more than one proxy device, in which case, host device A 102 (e.g., host device) may generate the same or different proxy keys for the proxy devices. Finally, there even may be more than one proxy key generator devices (e.g., multiple host devices A 102).

In various implementations, the communication links 108, 112 and/or 202 may be wireless and/or non-wireless.

FIG. 3 illustrates a method for generating, distributing, and authenticating a secure and restricted proxy key. Host device A 302 and client device B 304 have established a secured and/or authenticated communication mechanism using key cryptography. For example, symmetric key cryptography may be implemented where a shared secret key is known to both host device A and client device B 304. In one mode of operation, devices A 302 and B 304 can use the shared secret key to secure and authenticate communications between the two devices. Additionally, a key derivation function (KDF) is also provided to both devices A and B. The shared secret key and the KDF are used by host device A 302 to generate a constrained proxy key 308 that is sent 310 to a proxy device C 306. For example, host device A 302 operates as a proxy key generator, proxy device C 306 receives the proxy key and operates as a proxy for host device A, and client device B 304 operates an authenticator that authenticates the proxy key prior to establishing secure communications with proxy device C 306.

Proxy device C 306 stores the constrained proxy key 312, authenticates a message with the constrained proxy key 314, and sends the authenticates message establish a communication link 316 with device B 304. In one implementation, client device B 304 checks whether the received key is a proxy key 318 and, if so, independently generates a local proxy key 320 using its KDF. This may be done, for example, by checking whether a particular bit of the authenticated message 316 or received key has been set (thereby indicating that the received key is a proxy key). Client device B 304 may use the KDF, along with one or more private and/or public keys, parameters and/or constraints to generate the local proxy key.

Client device B 304 then authenticates the proxy device 322. For example, such authentication of proxy device C 306 may include decrypting received authentication message with the locally generated constrained proxy key. If the message is properly authenticated, it means that proxy device C 306 also has the same constrained proxy key (and is thus authenticated). A secure communication link may then be established 324 between client device B 304 and host device C 306. Proper authentication of the received authentication messages may be ascertained, for example, by client device B 304 comparing one or more received parameters to one or more parameters to determine if they are the same.

Client device B 304 may restrict the use of the proxy key as pre-arranged by device A 302 or defined by a received proxy constraint information from proxy device C 306. For instance, client device B 304 may expire of invalidate the proxy key 326 from proxy device C 306 after a certain amount of time. This may be accomplished when host device A 302 and client device B 304 have synchronized clocks and/or dates that are used to expire the constrained proxy key or as parameters to generate the constrained proxy key. For example, if the constrained proxy key is generated by host device A 302 using a date of Jan. 1, 2006, then the local constrained proxy key generated by client device B for authentication will only match on Jan. 1, 2006. After that date, the local constrained proxy key (generated at client device B 304) will no longer match the received constrained proxy key. This feature may be used by host device A 302 to make the constrained proxy key valid on only a particular date (e.g., the date on which proxy device C 306 is expected to need to communicate with client device B 304).

Figure 4:
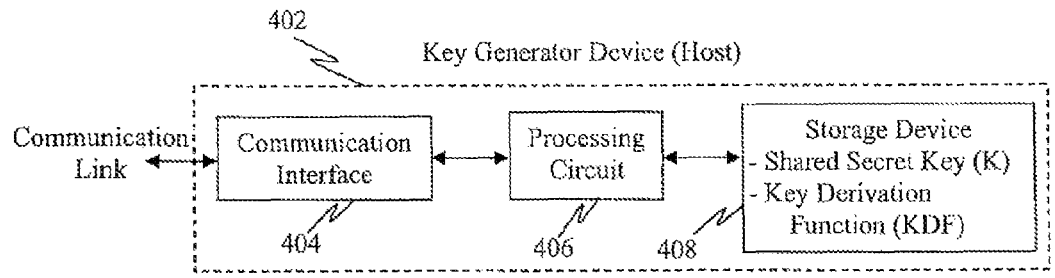
FIG. 4 is a block diagram illustrating one embodiment of a proxy key generator host device.

FIG. 4 is a block diagram illustrating one embodiment of a key generator host device (e.g., host device A 302 in FIG. 3). The key generator device 402 includes a communication interface 404 through which it may establish a secure communication link with other devices. A processing circuit 406 is configured to use key cryptography (e.g., symmetric or asymmetric keys) to secure communications to an/or from the key generator device 402. A storage device 408 may store a shared secret key (e.g., for a symmetric cryptography scheme) and a proxy key encrypting function or key derivation function (KDF) that may be shared with other secure devices beforehand (e.g., through independent distribution channels). The key generator device 402 may be configured to authenticate messages using a shared secret key and generate a proxy key based on the shared secret key and a proxy key derivation function.

Figure 5:
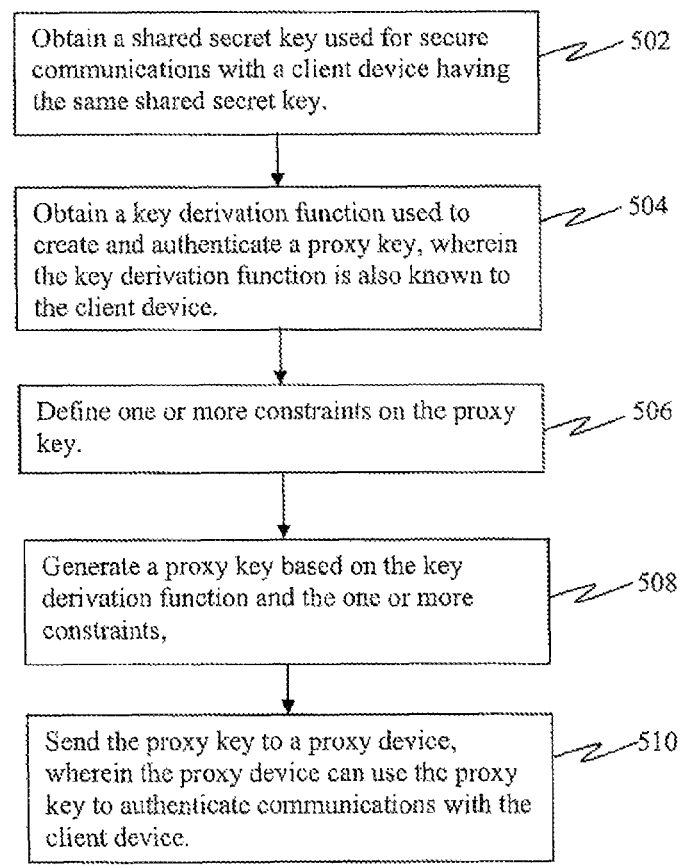
FIG. 5 illustrates a method operational on a proxy generator host device to generate and distribute a proxy key to another device.

FIG. 5 illustrates a method operational on the key generator host device 402 to generate and distribute a proxy key to another device. A shared secret key is obtained that can be used for secure communications with a client device (e.g., key authentication device 1202 in FIG. 12) having the same shared secret key 502. An encrypting function or key derivation function (KDF) is obtained that can be used by the host device to create and authenticate a proxy key, wherein the encrypting function is also known to the client device 504. The key derivation function may be a hash function or another type of function used to randomize or mix a value to obtain a different value. In an alternative embodiment, a first one-way function is obtained by the proxy generation device 402 to create the proxy key while a different second one-way function is used by client device for authentication.

One or more parameters or constraints on the proxy key are also defined 508 by the key generator host device 506. For example, the constrains may limit the types of messages or commands that a proxy device may send to the client device or the length of time for which the proxy key is valid. These constrains are also known to the client device. The host device generates the proxy key based on the key derivation function and the constraints 508. For example, the key generator host device 402 may use a shared secret key, a current date/time, and/or other parameters/constraints as inputs for the key derivation function to obtain a constrained proxy key. The proxy key is then sent to a proxy device, wherein the proxy device can use the proxy key to authenticate communications with the client device 510.

Figure 6:
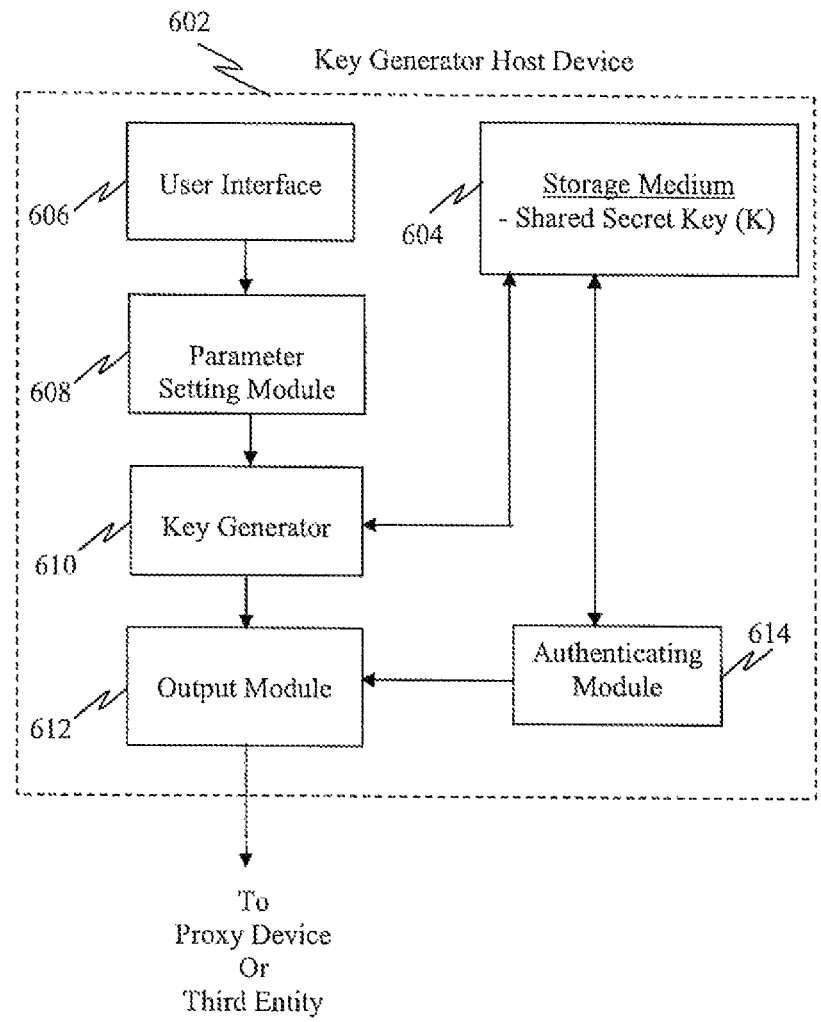
FIG. 6 illustrates another example a proxy key generator host device.

FIG. 6 illustrates another example of a key generator host device 602 (e.g., host device) including a storage medium 604, a user interface 606, a parameter setting module 608, a key generator 610, an output module 612 and an encrypting module 614. Storage medium 604 is configured to store a secret key K associated with a circuit device. According to one feature, authenticating module 614 may use the secret key K to authenticate messages and output module 612 may transmit the authenticated message to an associated client device.

In another feature, the key generator device 602 generates a proxy key K' based (at least partially) on the secret key K and sends it to a proxy device. The proxy key K' may have restrictions or constraints that may be selected or input through user interface 606 and parameters may be set through a parameter setting module 608 based on the selected constraints. The selected constraints may, for example, limit the use of the constrained proxy key K' in function, such as allowing a certain level of authority or limited privileges, and/or in time such as, allowing the constrained proxy key to be used during a certain period of time. Accordingly, the parameters/constraints may indicate use and/or access limitations of the constrained proxy key. The parameters may also comprise timestamps that indicate a time period during which a message encrypted with the constrained proxy key is valid.

Key generator 610 generates the constrained proxy key K' as a function of the parameters and the secret key K. Key generator 610 may generate the constrained proxy key K' by encrypting the parameters/constraints using the secret key K with a key derivation function. If the parameters include timestamps, the constrained proxy key K'p0 may be generated by encrypting the timestamps using the secret key K as follows:

$$K'-E_K(Ts,Te) \quad [1]$$

where E is an encryption or key derivation function based on secret K, Ts indicates the beginning of the validity period and Te indicates the end of the validity period. In equation 1, any known encryption or key derivation functions may be used, such as for example a hash function. In some implementations, more than one encryption/key derivation function may be used. For example, one of a plurality of encryption functions may be used to generate the constrained proxy key. In such cases, data designating which encryption function(s) or key derivation function(s) was used to encrypt the parameters/constraints may be transmitted.

The constrained proxy key K' is then sent to the third entity or proxy device through output module 612. The parameters/constraints used to generate the constrained proxy key K' is also sent to the proxy device through output module 612. The constrained proxy key K' and/or parameters may be transmitted non-wirelessly or wirelessly. Additionally, the constrained proxy key K' may be encrypted prior to transmitting to the proxy device. Other features may include transmitting through the output module 612 an indicator that notifies (a receiver) that a constrained proxy key has been generated.

It should be noted that key generator host device 602 is an example illustration and may include additional elements such as a controller configured to control other elements and/or a processor configured to perform various functions that may include portions of the operation described above. One or a combination of the elements may be rearranged without affecting the operation of key generator host device 602. One or a combination of the elements may also be combined into one element without affecting the operation of key generator host device 602.

Figure 7:
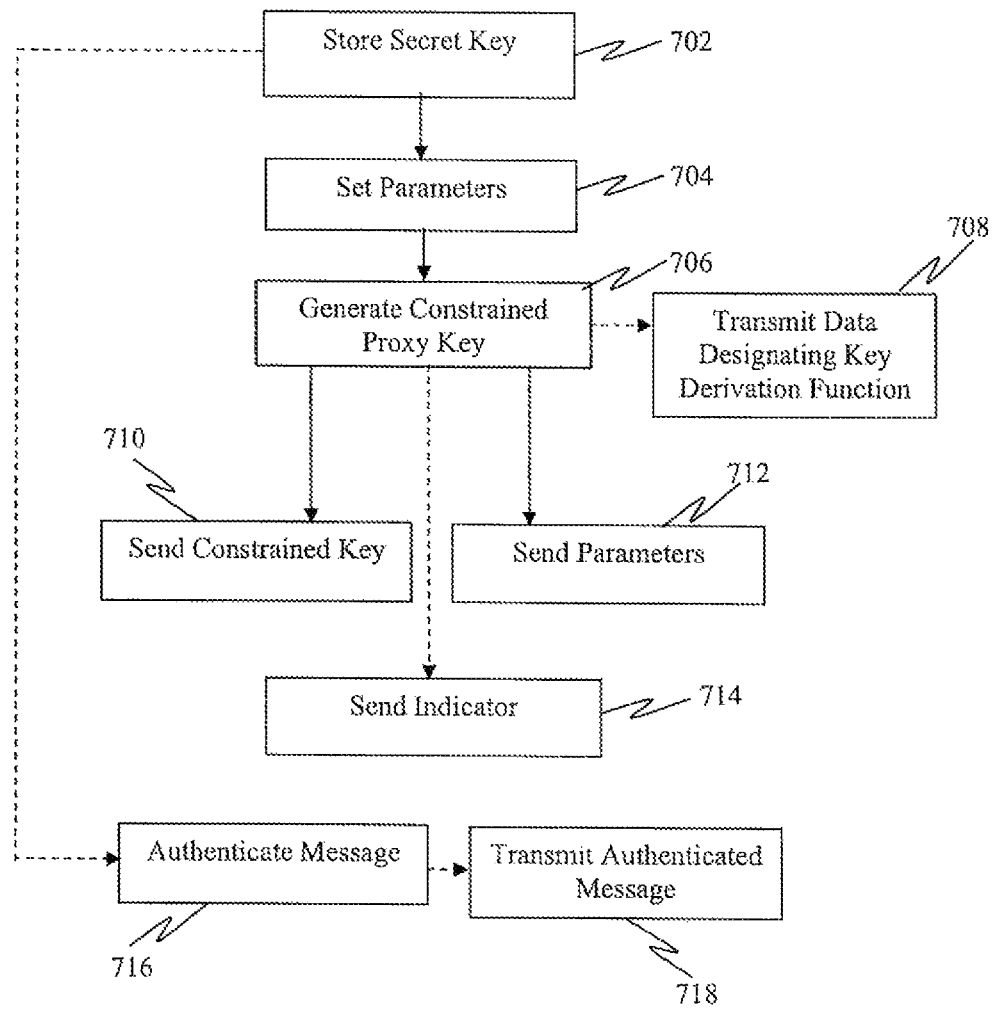
FIG. 7 illustrates a method that may be operational on a host device for generating a proxy key.

FIG. 7 illustrates a method that may be operational on a key generator host device for generating a proxy key. A secret key is stored 703 and parameters/constraints are set 704 based on selected constraints. A constrained proxy key is then generated 706 using the key derivation function, wherein the constrained proxy key is a function of the parameters/constrains and the secret key. The constrained proxy key may be generated using a key derivation function to encrypt the parameters/constraints using the secret key. In some implementations, the host device may select the key derivation function from among a plurality of cryptographic or key derivation functions. In such cases, the method may include transmitting data designating the one of the plurality of cryptographic or key derivation functions 708 used to generate the proxy key.

The constrained proxy key and/or the parameters/constraints are sent 710 and 712 to a second device (e.g., proxy device). The constrained proxy key may be transmitted non-wirelessly or wirelessly to the second device. The constrained proxy key may be encrypted prior to transmission. The parameters/constraints may comprise timestamps that indicate a time period during which the constraint proxy key is valid. The parameters/constraints may also indicate use limitations of the constrained proxy key.

The method may also comprise transmitting an indicator 714 (e.g., a message flag, et.) notifying a receiver that the associated key is a constrained proxy key. The method may additionally comprise authenticating a message 716 using the secret key and transmitting the authenticated message 718.

Figure 8:
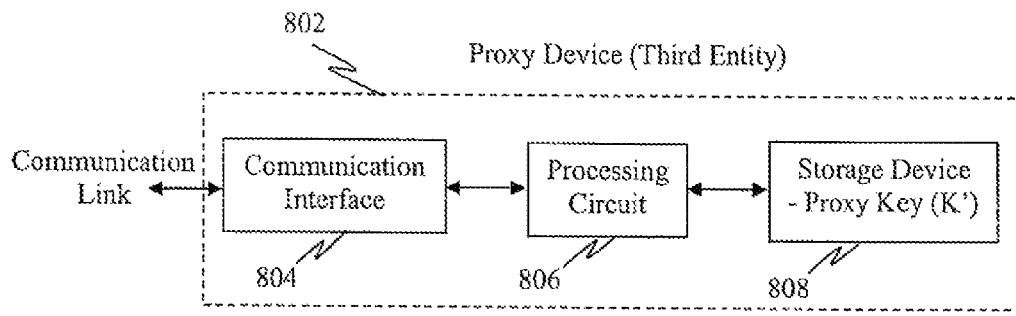
FIG. 8 is a block diagram illustrating one embodiment of a proxy device.

FIG. 8 is a block diagram illustrating one embodiment of a proxy device (e.g., proxy device C 306 in FIG. 3). The proxy device 802 includes a communication interface 804 through which it may establish a communication link with other devices. A processing circuit 806 is configured to use cryptography key(s) (e.g., symmetric or asymmetric keys) to secure communications to and/or from the proxy device 802. A storage device 808 may store a proxy key received from a key generator host device so that it can be used to authenticate communications with a client device.

Figure 9:
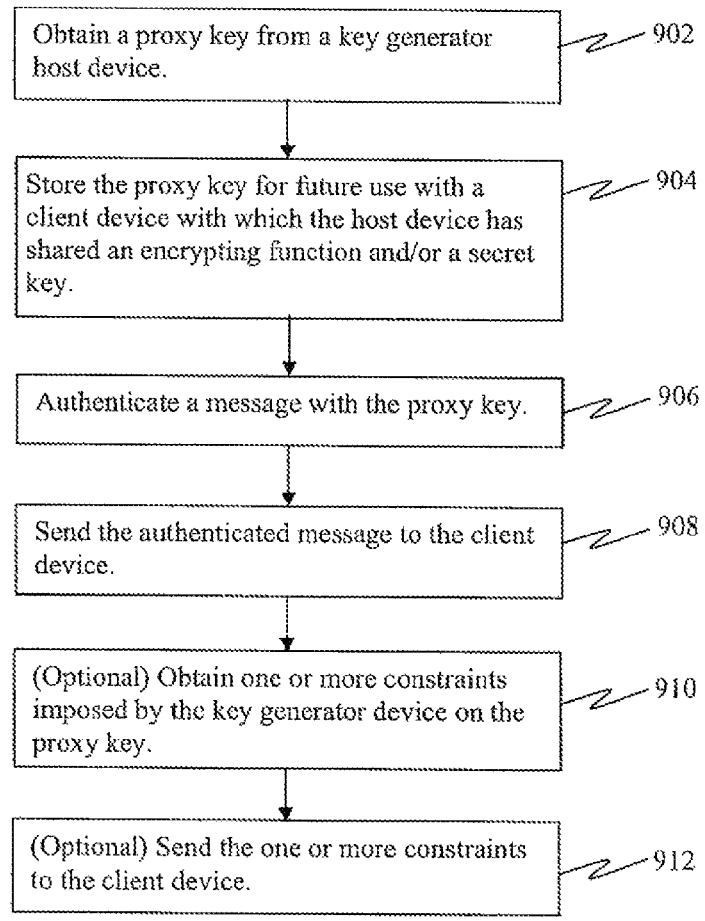
FIG. 9 illustrates a method operational on the proxy device to obtain a proxy key and use it to authenticate communications with another device.

FIG. 9 illustrates a method operational on the proxy device 802 to obtain a key and use it to authenticate communications with a client device. A proxy key is obtained from a key generator host device 902. This proxy key may be sent by a key generator host device or requested by the proxy device. In some implementations, the proxy key may be generated by the key host generator device using a cryptographic or key derivation function and a secret key. The proxy key is stored (by the proxy device) for future use with an authentication client device with which the key generator host device has shared the key derivation function and/or a secret key 904. A message is authenticated using the proxy key 906. The authenticated message is sent to the authentication client device 908. In some implementations, the proxy device may obtain one or more constraints imposed by the key generator host device on the proxy key 910. These constraints may be sent by the key generator host device along with, or as part of, the proxy key. The one or more constraints are passed along to the authentication client device 912. In an alternative implementation, the constraints on the proxy key may instead be prearranged between the proxy key generator host device (e.g., host device A 302 in FIG. 3) and the authentication client device (e.g., client device B 304 in FIG. 3).

According to another feature, the proxy device may receive an encrypted message from a client device. It then authenticates the client device by using the proxy key to decrypt the message from the client device.

Figure 10:
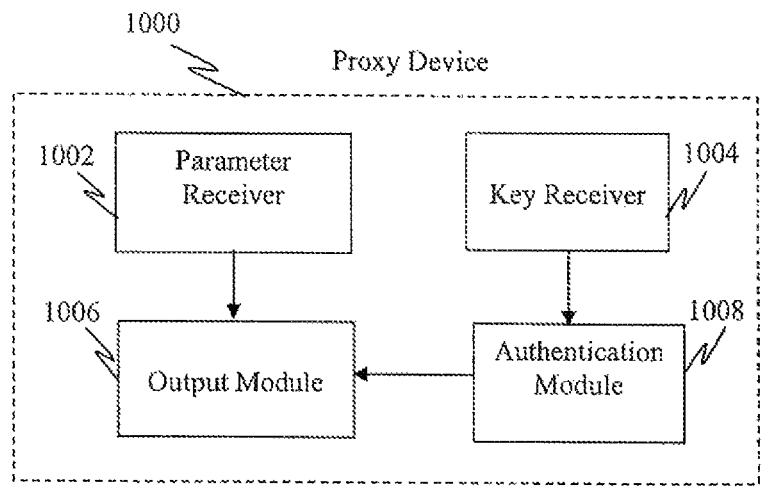
FIG. 10 illustrates an example of another proxy device.

FIG. 10 illustrates an example of another proxy device 1000. Proxy device 1000 comprises a parameter receiver 1002, a key receiver 1004, an encrypting module 1006 and an output module 1008. Parameter receiver 1002 is configured to receive parameters indicating selected constraints. As describe above, the selected constraints may, for example, limit the use of the proxy key K' in function and/or in time. Accordingly, the parameters/constraints may indicate use limitations of the constrained proxy key k'. The parameters/constraints may also comprise timestamps indicating a time period during which a message encrypted with the constrained proxy key is valid. Key receiver 1004 is configured to receive a constrained proxy key K' from a key generator host device. The constrained proxy key K' is a function of the parameters/constraints and a secret key K. The constrained key may be generated by using the parameters/constraints and the secret key K as inputs to a cryptographic function. For example, the constrained proxy key K' may be generated based on Equation 1 above. The constrained proxy key K' and/or parameters may be received non-wirelessly or wirelessly. Additionally, the constrained proxy key K' may be received in encrypted form. In such cases, the encrypted constrained proxy key is decrypted to obtain the constrained proxy key K'.

Authentication module 1008 authenticates, encrypts, and/or secures a message using the constrained proxy key K' and output module 1006 sends the authenticated message. Here, the message may include data and the received parameters/constraints. Output module 1006 may also send the received parameters/constraints without encrypting. Other aspects may include sending an indicator through the output module 1006 that notifies a receiving client device that a constrained key is being used (e.g., that the key with which the message is authenticated is a constrained key).

By sending the received parameters/constraints as well as the parameters/constraints authenticated (e.g., encrypted) using the constrained proxy key K', a message authentication code (MAC) is created. Accordingly, client devices (e.g., authentication devices) can determine the validity, authenticity and/or integrity of messages received from a proxy device or third entity by comparing the received parameters with parameters recovered using a locally-generated constrained proxy key k' generated based on the same received parameters.

It should be noted that proxy device 1000 is an example illustration and may include additional elements such as a controller configured to control other elements of proxy device 1000, a user interface configured to receive user input, a storage medium, and/or a processor configured to perform various functions that may include portions of the operation described above. One or a combination of the elements may be rearranged or combined without affecting the operation of proxy device 1000.

Figure 11:
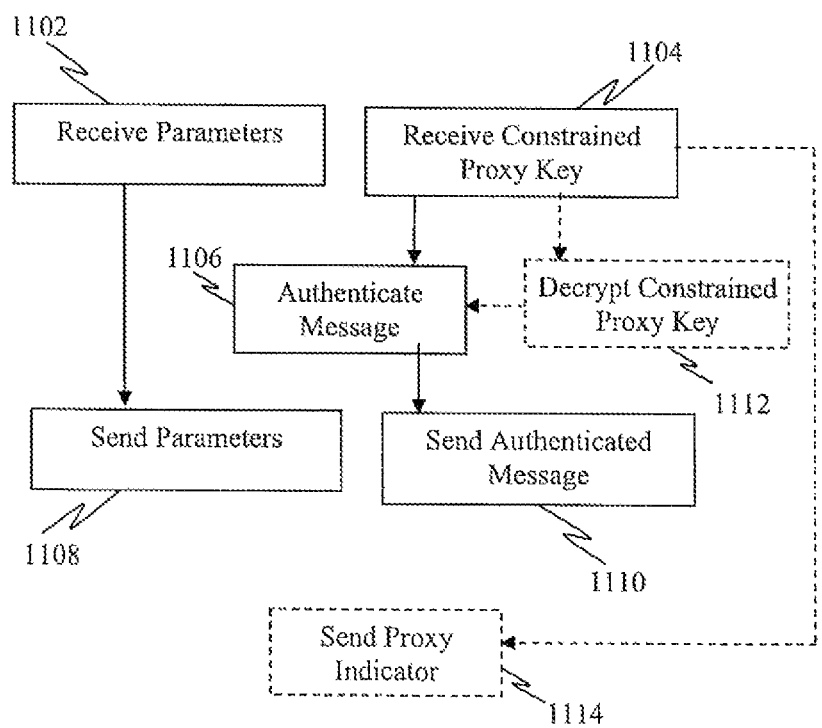
FIG. 11 illustrates another method for use by a proxy device in authenticating communications with a client device.

FIG. 11 illustrates another method for use by a proxy device in authenticating communications with a client device. Parameters indicating selected constraints are received 1102 and a constrained proxy key is received 1104, wherein the constrained proxy key is a function of the constraint parameters/constraints and a secret key. A message is authenticated (e.g., encrypted or secured) 1106 using the constrained proxy key, wherein the message may include data and the parameters. The authenticated message and the received constraint parameters are then sent or transmitted 1108 and 1110. The received constrained proxy key may have been generated by encrypting the constraint parameters using the secret key. The constrained proxy key may be received non-wirelessly or wirelessly. The constrained proxy key may be encrypted or otherwise secured when received. If encrypted, the method would include decrypting 1112 the constrained proxy key.

The received parameters/constraints may comprise timestamps that indicate a time period during which a message is valid. The parameters may indicate use limitations of the constrained proxy key. The method may also comprise sending a proxy indicator 1114, such as a flag, notifying a client receiver that the key is a constrained proxy key.

Figure 12:
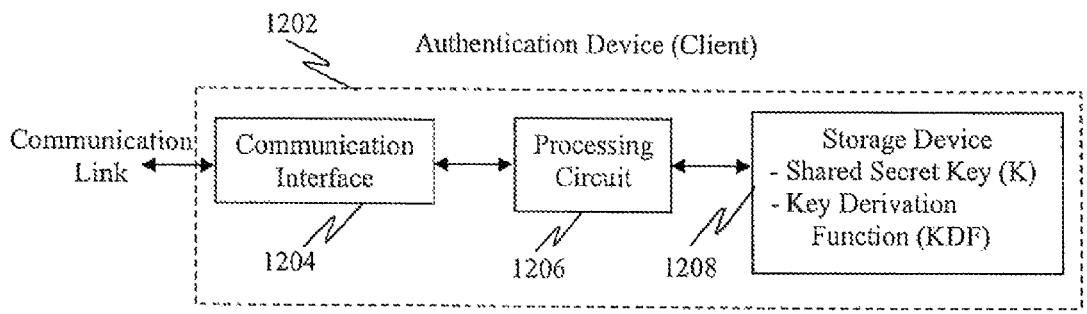
FIG. 12 is a block diagram illustrating one embodiment of a key authentication client device.

FIG. 12 is a block diagram illustrating one embodiment of a key authentication client device (e.g., client device B 304 in FIG. 3). The key authentication client device 1202 includes a communication interface 1204 through which it may establish a secure communication link with other devices, such as a key generator host device (e.g., host device 402 in FIG. 4) and a proxy device (e.g., proxy device 802 in FIG. 8). A processing circuit 1206 is configured to use cryptographic key(s) (e.g., symmetric or asymmetric keys) to authenticate communications to and/or from the key authentication client device. A storage 1208 may store a shared secret key (e.g., for asymmetric cryptography scheme) and a cryptographic function (e.g., key derivation function) that may be shared with other secure devices (such as a key generator host device) beforehand (e.g., through independent and/or secure distribution channels).

Figure 13:
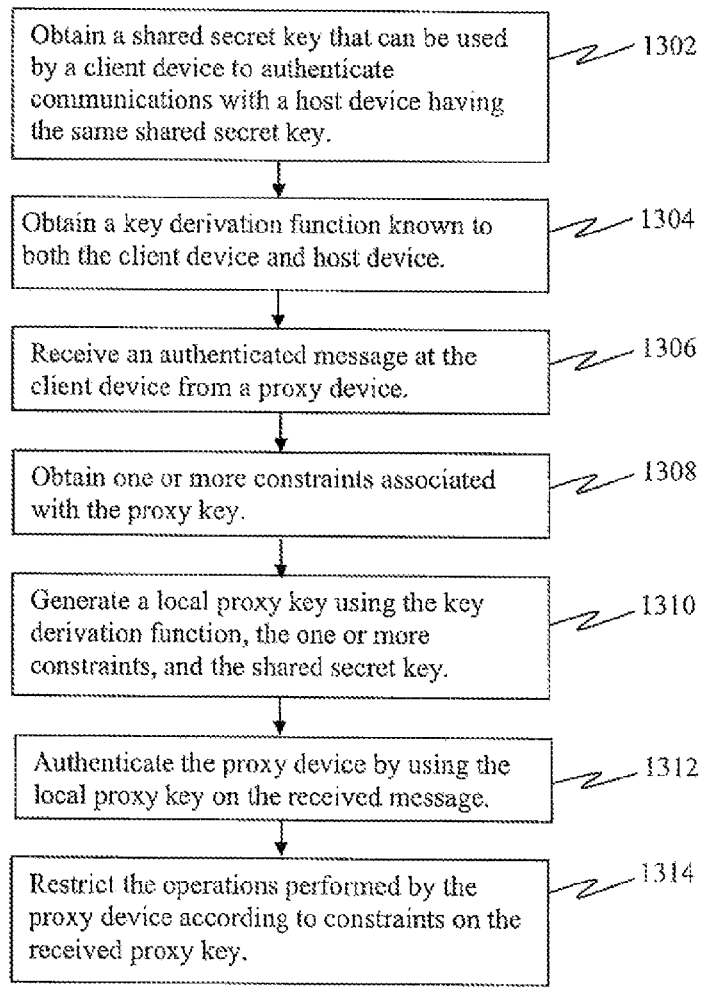
FIG. 13 illustrates a method operational on the key authenticating client device to authenticate and use a constraint key from a proxy device to establish secure communications and/or authenticate the proxy device.

FIG. 13 illustrates a method operational on the key authentication client device 1201 to authenticate and use a constraint key from a proxy device. A shared secret key is obtained that can be used by the client device (e.g., authentication device) for secure communications with a host device (e.g., key generator device 402 in FIG. 4) having the same shared secret key 1302. A key derivation function is obtained that is known to both the client device and host device 1304. The shared secret key and/or the key derivation function may be provided to the key authentication client device via an independent distribution channel. An authenticated message is received from a proxy device 1306, wherein the message was encrypted using a proxy key originally generated by the host device. The client device also obtains one or more constraints associated with the proxy key 1308. The constrains may be obtained from the proxy device and/or from the host device. A local proxy key is generated by the client device using the key derivation function, the one or more constraints, and the shared secret key 1310. The proxy device is authenticated by using the local proxy key on the received message. That is, if the locally generated proxy key is the same as the proxy key with which the proxy device authenticated the message, then the client will properly authenticate (e.g., decrypt) the message.

The operations performed by the proxy device may be restricted according to constrains on the proxy key 1316. In one implementation, the constraints on the proxy key may be received with, or are part of, the proxy key. In an alternative implementation, the constraints on the proxy key may instead be prearranged between the host device (e.g., the proxy key generator device) and the client device (e.g., proxy key authentication device) via an independent distribution channel or via a secure communication link there between. In yet another embodiment, the constraints on the proxy key may be implied. For example, the client device 1202 may include different communication interfaces, e.g., a primary interface for communicating with proxy key generator host devices, and a secondary interface for communicating with proxy devices. If a proxy key is received over the secondary interface, then the proxy authentication device assumes it is a proxy key and authenticates it accordingly. Another type of received constraint may be one or more timestamps that indicate a period of time for which the proxy key is valid.

Figure 14:
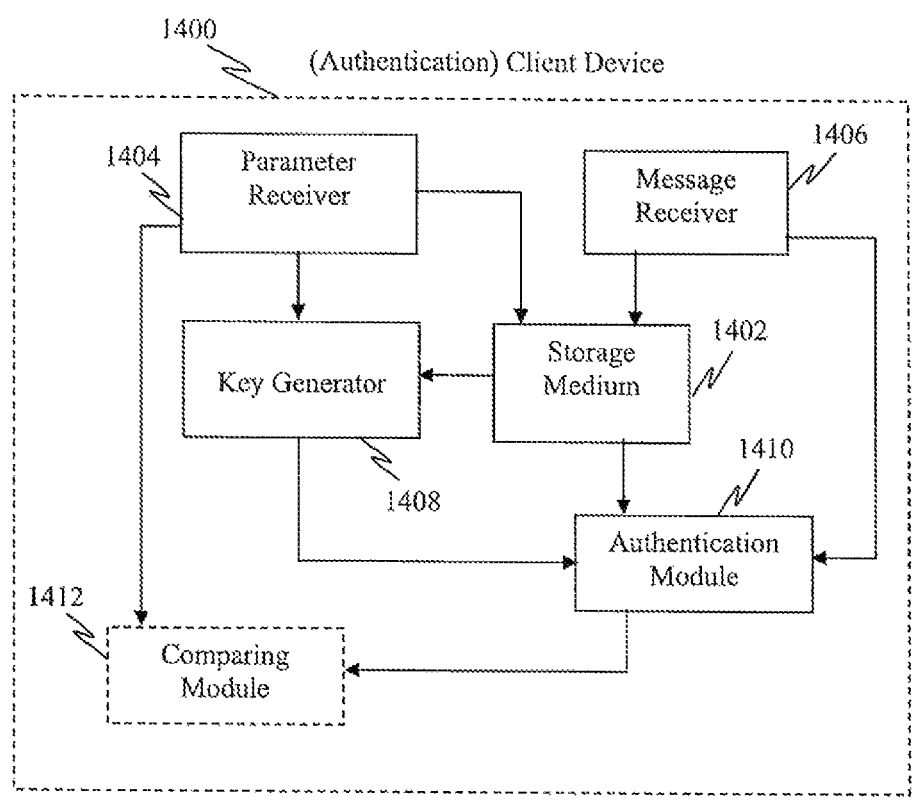
FIG. 14 illustrates an example client device comprising a storage medium, a parameter receiver, a message receiver, a key generator, and a decrypting module.

FIG. 14 illustrates an example (authentication) client device 1400 comprising a storage medium 1402, a parameter receiver 1404, a message receiver 1406, a key generator 1408, and an authentication module 1410. Storage medium 1402 is configured to store a secret key K. Authentication module 1410 may use the secret key K to authenticate (e.g., decrypt) messages received through message receiver 1406. If the authentication of the received message using the secret key K fails, client device 1400 generates a constrained proxy key which it can then use to authenticate the received message. In some implementations, an indicator is received that notifies the client device 1400 that the received message is authenticated using a proxy key. Accordingly, if the indicator indicates a received message is authenticated using a (constrained) proxy key, the (authentication) client device 1400 generates a local proxy key using the indicated constraints to authenticate the received message and verify the authenticity of the received message and/or sender of the message.

Parameter receiver 1404 receives parameters indicating selected constraints. The selected constraints may, for example, limit the use of the constrained proxy key in function and/or in time. The parameters may indicate use limitations of the constrained proxy key. The parameters may also comprise timestamps that indicate a time period during which a message encrypted with the constrained proxy key is valid.

In order to authenticate a received message, key generator 1408 generates a local proxy key as a function of the received parameters (i.e., constraints) and the secret key K. Key generator 1408 generates the local proxy key in a manner analogous to the key generator 610 in FIG. 6. Thus, key generator 1408 may generate the local proxy key by using a key derivation function (a type of cryptographic key) incorporating the parameters/constraints and the secret key K. If the parameters include timestamps, the proxy key may be generated by encrypting the timestamps as in Equation [1]. Depending on the implementations, more than one key derivation function may be used. For example, one of a plurality of cryptographic functions may be used to generate the local constrained key. In such cases, data designating one of the cryptographic functions may be received by client device 1400. Key generator 1408 may generate the local proxy key using the designed key derivation function to incorporate the parameters (constraints) and the secret key. Once the local proxy key is generated, authentication module 1410 is configured to authenticate the received message using the local proxy key to recover data and the parameters (constraints) therein.

Client device 1400 may further comprise a comparing module 1412. Comparing module 1412 is configured to compare the received parameters (constraints) and the recovered parameters (e.g., constrains from authenticated message). For example, the proxy device is authenticated if the received parameters (constraints) and the recovered parameters (constraints) match. For example, if the parameters are timestamps, the received message is authenticated if the message is received within the time period indicated by the parameters.

In an alternative implementation, the parameters (constraints) used to generate the proxy key are independently obtained by the client device. For example, the host device may provide the parameters (constraints) beforehand. The client device then uses these constraints to generate the local proxy key and authenticate the proxy device (e.g., authenticate a message received from the proxy device).

It should be noted that client device 1400 is an example illustration and may include additional elements such as a controller configured to control other elements of client device 1400 and/or a processor configured to perform various functions that may include portions of the operation described above. Client device 1400 may also comprise elements for telecommunication as well as elements for wireless communication. One or a combination of the elements may be rearranged without affecting the operation of client device 1400. One or a combination of the elements may also be combined into one element without affecting the operation of client device 1400.

Figure 15:
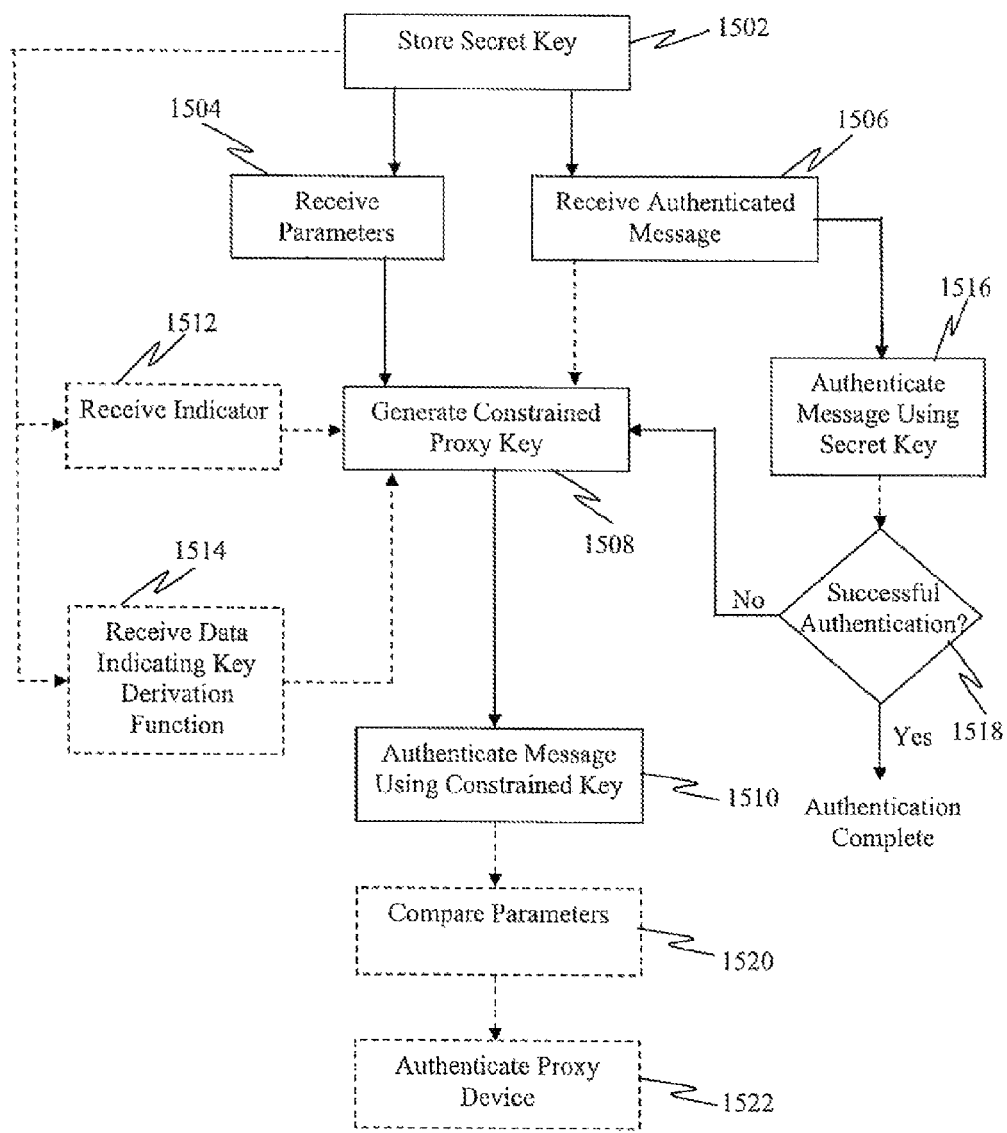
FIG. 15 illustrates a further method for authenticating communications by a client device.

FIG. 15 illustrates a further method for authenticating communications by a client device. A secret key for use in secure communications is stored 1502. This secret key may be shared with the host device that provides a constrained key to the proxy device. Parameters indicating selected constraints 1504 and a received message authenticated using the constrained key are received and 1506 by the client device. The message may comprise data and the parameters. The received message 1506 may be authenticated using the secret key 1516. If the authentication of the received message is successful 1518 (e.g., the message is properly decrypted) the authentication is complete. That is, such message was authenticated by another device that knew the secret key. Otherwise, if the authentication of the received message fails 1518, a constrained proxy key is locally generated 1508 using a key derivation function, the secret key and one or more parameters (constraints) to authenticate the message 1510. The received message is authenticated 1510 using the locally generated proxy key to recover the data and the parameters.

The constrained proxy key may be generated based on the received parameters and the secret key by using a cryptographic function, for example, a key derivation function (KDF). The method may also include receiving an indicator 1512 notifying the receiving client device that a received message is authenticated (e.g., encrypted) with a (constrained) proxy key. The constrained proxy key may then be generated directly (rather than attempting authentication) with the secret key 1516) if the indicator indicates a (constrained) proxy key was used to authenticate a received message. The indicator may be a flag, for example. The method may additionally included receiving data designating one of a plurality of cryptographic functions 1514. In such cases, the constrained proxy key may be generated using the indicated cryptographic function using the parameters and the secret key as inputs.

The method may further include comparing the received parameters 1520 and the recovered parameters (e.g., decrypted from the received message), and authenticating the proxy device 1522 based on the comparison and the parameters. The proxy device may be authenticated if the received parameters and the recovered parameters match. The received and the recovered parameters may comprise timestamps. The timestamps may indicate a time period during which a message is valid. The message may then be authenticated if the message is received within the time period. The received and the recovered parameters may further indicate use limitations of the constrained key.

Figure 16:
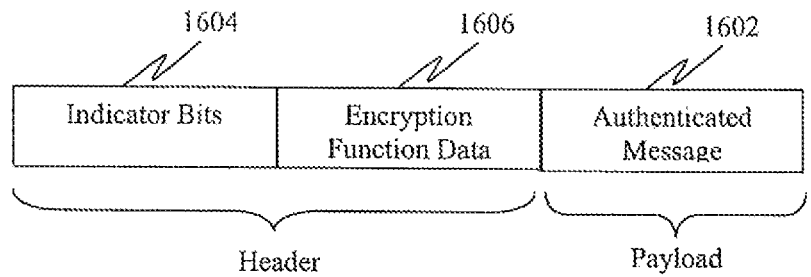
FIG. 16 illustrates a message format that may be used for a message received by a (authentication) client device.

FIG. 16 illustrates a message format that may be used for a message received by a (authentication) client device. The data format would comprise an authenticated message field 1110. The data format may also comprise an indicator bits field 1604 for an indicator that notifies whether a constrained key is generated. The indicator bits may be a one bit long flag where, for example, bit=0 would indicate that a constrained key has not been generated and bit=1 would indicate that a constrained key is generated, or vice versa. The data format may additionally include a field 1606 for data that designates one of a plurality of encryption functions used to generate the constrained key. The length of this data field 1606 may depend on the number of encryption functions. For example, if there are three or four encryption functions, this data filed 1606 may be two bits having four states of 00, 01, 10 and 11, each corresponding to one of the three (one state would not be used) or four encryption functions. Data fields 1604 and 1606 may be in the header of a message communicated to mobile devices. The data field 1602 may be in the payload of a message communicated to client devices.

Figure 17:
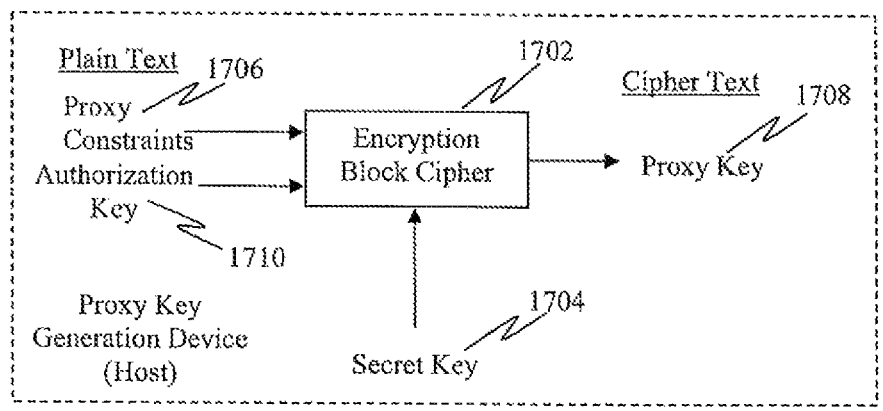
FIG. 17 illustrates how a block cipher may be used as one type of proxy key derivation function in a proxy key generation device.

FIG. 17 illustrates how a block cipher may be used as one type of cryptographic function (e.g., key derivation function) in a proxy key generator host device. The block cipher 1702 receives a secret key 1704, and one or more constraints 1706 and an authorization key 1710 (plain text) to generate the proxy key 1708 (cipher text). In this implementation, the proxy key generation host device encodes the proxy constraints and an authentication key as part of the proxy key 1708.

Figure 18:
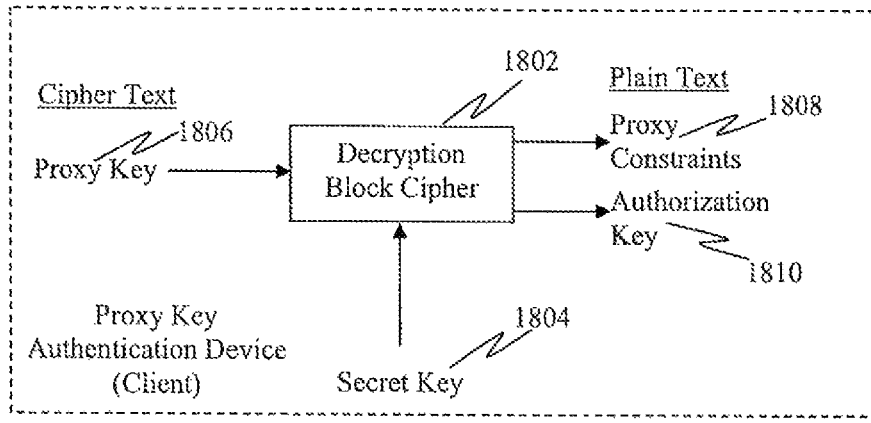
FIG. 18 illustrates how a block cipher may be used as one type of proxy key derivation function in a proxy key authentication device.

FIG. 18 illustrates how a block cipher may be used as one type of cryptographic function (e.g., key derivation function) in a proxy key authentication client device. The block cipher 1802 uses a secret key 1805 (previously known to the authentication device) and a received proxy key 1806 (cipher text) from a proxy device to obtain the proxy constraints 1808 and authorization key 1810 (plain text). The authentication key 1810 can then be used by the authentication device to determine whether the proxy device that sent the proxy key is authorized to set as a proxy.

While various examples described herein have used symmetric key cryptography (e.g., shared secret keys, cipher blocks, etc.) the proxy key scheme may also be implemented using asymmetric key cryptography as well.

One or more of the components, steps, and/or functions illustrated in FIGS. 1-18 may be rearranged an/or combined into a single component, step, or function or embodied in several components, steps, or functions without departing from the invention. Additional elements, components, steps, and/or functions may also be added without departing from the invention. The apparatus, devices, and/or components illustrated in FIGS. 1, 2, 3, 5, 6, 8, 20, 12, 14, 17 and/or 18 may be configured to perform one or more of the methods, features, or steps described in FIGS. 3, 5, 7, 9, 11, 13, and/or 15.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system.

It should be noted that the foregoing embodiments are merely examples and are not be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for generating a proxy key on a host device, comprising:
   obtaining a shared secret key used for securing communications with a client device having the same shared secret key for implementing symmetric key cryptography;
   obtaining a first key derivation function, wherein the first key derivation function is related to a second key derivation function known to the client device;
   generating a proxy key based on the first key derivation function, one or more operating constraints, and the shared secret key, where the one or more operating constraints restrict the operation of the client device relative to the proxy device; and
   providing the proxy key to a proxy device, wherein the proxy device can use the proxy key to authenticate communications with the client device which can independently recreate the proxy key for verification.

2. The method of claim 1, wherein the proxy key permits the proxy device to control operations on the client device according to the one or more operating constraints.

3. The method of claim 1 wherein the host device monitors communications between the proxy device and client device using the proxy key.

4. The method of claim 1 wherein the one or more constraints are sent to the client device.

5. The method of claim 1 wherein the shared secret key is used in a symmetric key security scheme between the host device and the client device and the proxy key is utilized by the proxy device when communications between the host device and proxy device are terminated.

6. The method of claim 1 wherein the first key derivation function is an encryption block cipher.

7. The method of claim 1 further comprising:
   storing a plurality of cryptographic functions; and
   selecting the first key derivation function from among the plurality of cryptographic functions.

8. The method of claim 1 wherein generating the proxy key includes using the one or more operating constraints as parameters to the first key derivation function along with the shared secret key to obtain the proxy key.

9. The method of claim 8 further comprising:
   transmitting a data designating one of a plurality of key derivations functions.

10. The method of claim 8 wherein the one or more operating constraints include timestamps indicating a period during which the proxy key is valid.

11. A host device, comprising:
    a communication interface for communicating with other devices;
    a storage device for storing a shared secret key and key derivation function, wherein the shared secret key and key derivation function are both known to a client device and used as part of symmetric key cryptography; and
    a processing circuit coupled to the communication interface and the storage device, the processing circuit configured to
        generate a proxy key based on the key derivation function, one or more operating constraints, and the shared secret key, where the one or more operating constraints restrict operation of the client device relative to the proxy device, and
        send the proxy key to a proxy device, wherein the proxy device can use the proxy key to authenticate communications with the client device which can independently recreate the proxy key for verification.

12. The host device of claim 11, wherein the proxy key permits the proxy device to control operations on the client device according to the one or more operating constraints.

13. The host device of claim 12 wherein the one or more constraints are pre-arranged with the client device.

14. The host device of claim 12 wherein one of the operating constraints causes the proxy key to expire after an amount of time.

15. The host device of claim 12 wherein the processing circuit is further configured to:
    send the one or more constraints to the proxy device.

16. The host device of claim 11 wherein the processing circuit is further configured to
    monitor communications between the proxy device and client device using the proxy key.

17. The host device of claim 11 wherein the key derivation function is an encryption block cipher.

18. The host device of claim 11 wherein the storage device stores a plurality of cryptographic functions and the processing circuit is configured to select the key derivation function from among the plurality of cryptographic functions.

19. The host device of claim 18 wherein the processing circuit is further configured to
    transmit a data designating the selected key derivation function from the plurality of cryptographic functions used to incorporate one or more constraints into the proxy key.

20. A proxy generation device comprising:
    means for obtaining a shared secret key used for secure communications with a client device having the same shared secret key for implementing symmetric key cryptography;

means for obtaining a key derivation function, wherein the key derivation function is also known to the client device;

means for generating a proxy key based on the key derivation function, one or more operating constraints, and the shared secret key, where the one or more operating constraints restrict operation of the client device relative to the proxy device; and means for sending the proxy key to a proxy device, wherein the proxy device can use the proxy key to authenticate communications with the client device which can independently recreate the proxy key for verification.

21. The proxy generation device of claim 20 further comprising:

means for defining the one or more operating constraints on the proxy key at the host device; and means for conveying the one or more operating constraints to the client device, wherein the key derivation function uses the one or more operating constraints and the shared secret key to generate the proxy key.

22. A processor configured to generate a proxy key on a host device, comprising:

a processing circuit configured to obtain a shared secret key used for secure communications with a client device having the same shared secret key used for symmetric key cryptography;

obtain a key derivation function, wherein the key derivation function is related to a second key derivation function known to the client device;

generate the proxy key based on the key derivation function, one or more operating constraints, and the shared secret key, where the one or more operating constraints restrict operation of the client device relative to the proxy device; and provide the proxy key to a proxy device, wherein the proxy device can use the proxy key to authenticate communications with the client device which can independently recreate the proxy key for verification.

23. The processor of claim 22 wherein the processing circuit is further configured to monitor communications between the proxy device and client device using the proxy key.

24. The processor of claim 22, wherein the proxy key permits the proxy device to control operations on the client device according to the one or more operating constraints.

25. The processor of claim 23 wherein the processing circuit is further configured to provide the one or more operating constraints to the client device.

26. A non-transitory machine-readable medium having one or more instructions for generating a proxy key at a host device, which when executed by a processor causes the processor to:

obtain a shared secret key used for secure communications with a client device having the same shared secret key for implementing symmetric key cryptography;

obtain a key derivation function, wherein the key derivation function is related to a second key derivation function known to the client device;

generate the proxy key based on the key derivation function, one or more operating constraints on the proxy key, and the shared secret key, where the one or more operating constraints restrict operation of the client device relative to the proxy device; and provide the proxy key to a proxy device, wherein the proxy device can use the proxy key to authenticate communications with the client device which can independently recreate the proxy key for verification.

27. The non-transitory machine-readable medium of claim 26 further having one or more instructions which when executed by a processor causes the processor to:

monitor communications between the proxy device and client device using the proxy key.

28. The non-transitory machine-readable medium of claim 27, wherein the one or more operating constraints limit types of messages the proxy device may send to the client terminal.

29. A method operational on a proxy device, comprising:

obtaining a proxy key from a host device, wherein the proxy key is based on a secret key unknown to the proxy device and one or more operating constraints that restrict operation of a client device relative to the proxy device;

storing the proxy key for use with the client device with which the host device has shared a key derivation function and a secret key for implementing symmetric key cryptography;

authenticating a message with the proxy key; and sending the authenticated message to the client device to authenticate the proxy device to the client device which independently recreates and verifies the proxy key.

30. The method of claim 29 further comprising:

receiving an authenticated message from the client device; and authenticating the client device by using the proxy key to authenticate the message from the client device.

31. The method of claim 29 further comprising:

obtaining the one or more operating constraints imposed by the host device on the proxy key; and sending the one or more operating constraints to the client device.

32. The method of claim 29 wherein the proxy key permits the proxy device to control operations on the client device according to the one or more operating constraints.

33. The method of claim 29 further comprising:

sending an indicator to the client device indicating that the authenticated message is authenticated using a proxy key.

34. The method of claim 29 further comprising:

transmitting a data to the client device designating a key derivation function used to generate the proxy key.

35. A proxy device comprising:

a communication interface for communicating with a host device and a client device;

a storage device; and a processing circuit coupled to the communication interface and the storage device, the processing circuit configured to obtain a proxy key from the host device, wherein the proxy key is based on a secret key unknown to the proxy device and one or more operating constraints that restrict operation of the client device relative to the proxy device, store the proxy key in the storage device for use with the client device, wherein the host device and client device share a key derivation function and a secret key for implementing symmetric key cryptography, authenticate a message using the proxy key, and send the authenticated message to the client device to authenticate the proxy device to the client device which independently recreates and verifies the proxy key.

36. The proxy device of claim 35 wherein the processing circuit is further configured to
obtain one or more operating constraints imposed by the host device on the proxy key; and
send the one or more operating constraints to the client device.

37. The proxy device of claim 35 wherein the proxy key permits the proxy device to control operations on the client device according to the one or more operating constraints.

38. A proxy device comprising:
means for obtaining a proxy key from a host device, wherein the proxy key is based on a secret key unknown to the proxy device and one or more operating constraints that restrict operation of a client device relative to the proxy device;
means for storing the proxy key for use with the client device with which the host device has shared a key derivation function and a secret key to implement symmetric key cryptography;
means for authenticating a message with the proxy key; and
means for sending the authenticated message to the client device to authenticate the proxy device to the client device which independently recreates and verifies the proxy key.

39. The proxy device of claim 38 wherein the proxy key permits the proxy device to control operations on the client device according to the restrictions of the one or more operating constraint.

40. A method operational on a client device for authenticating a proxy device, comprising:
obtaining a shared secret key known to both a host device and the client device to implement symmetric key cryptography;
obtaining a key derivation function known to both the client device and the host device;
obtaining one or more operating constraints that restrict operation of the client device relative to the proxy device;
receiving an authenticated message at the client device from a proxy device;
generating a local proxy key using the key derivation function, the one or more operating constraints, and the shared secret key; and
authenticating the proxy device at the client device by using the local proxy key to verify the received authenticated message.

41. The method of claim 40, wherein the one or more operating constraints limit operations the proxy device may perform on the client terminal.

42. The method of claim 41 further comprising:
generating the local proxy key using the one or more operating constraints.

43. The method of claim 42 wherein the one or more operating constraints cause the authentication of the proxy device to expire after an amount of time.

44. The method of claim 40 further comprising:
receiving an indicator that the received message is authenticated by a second proxy key.

45. The method of claim 44 further comprising:
receiving an indicator of a key derivation function used to generate the second proxy key.

46. The method of claim 40 wherein the proxy device is authenticated by the client device if the local proxy key successfully decrypts the secured message.

47. A client device, comprising:
a communication interface for communicating with a proxy device;
a storage device for storing a shared secret key and a key derivation function, wherein the shared secret key and key derivation function are both known to a host device to implement symmetric key cryptography; and
a processing circuit coupled to the communication interface and the storage device, the processing circuit configured to
obtain one or more operating constraints that restrict operation of the client device relative to the proxy device,
receive a secure message from the proxy device,
generate a local proxy key using the key derivation function, the one or more operating constraints, and the shared secret key, and
authenticate the proxy device by using the local proxy key to verify the received secure message.

48. The client device of claim 47, wherein the one or more operating constraints limit operations the proxy device may perform on the client terminal.

49. The client device of claim 47 wherein one of the one or more operating constraints causes the authentication of the proxy device to expire after an amount of time.

50. The client device of claim 47 wherein the processing circuit is further configured to:
receive an indicator that the received message is authenticated by a proxy key; and
receive an indicator of a key derivation function used to secure the received message.

51. A client device, comprising:
means for obtaining a shared secret key that can be used by a host device to authenticate communications with the client device having the same shared secret key by implementing symmetric key cryptography;
means for obtaining a key derivation function known to both the host device and client device;
means for obtaining one or more operating constraints that restrict operation of the client device relative to the proxy device;
means for receiving an authenticated message at the client device from a proxy device;
means for generating a local proxy key using the key derivation function, the one or more operating constraints, and the shared secret key; and
means for authenticating the proxy device by using the local proxy key to verify the received authenticated message.

52. The client device of 51 further comprising:
means for obtaining one or more constraints;
means for generating the local proxy key using the one or more constraints; and
means for restricting operations that can be performed by the proxy device according to the one or more constraints.

53. A processor configured to authenticate a proxy device on a client device, comprising:
a processing circuit configured to
obtain a shared secret key that can be used by a host device to authenticate communications with the client device having the same shared secret key by implementing symmetric key cryptography;
obtain a key derivation function known to both the client device and host device;

obtain one or more operating constraints that restrict operation of the client device relative to the proxy device;

receive an authenticated message at the client device from the proxy device;

generate a local proxy key using the key derivation function, the one or more operating constraints, and the shared secret key; and authenticate the proxy device at the client device by using the local proxy key to verify the received authenticated message.

54. The processor of claim 53, wherein the one or more operating constraints limit operations the proxy device may perform on the client terminal.

55. The processor of claim 53 wherein the processing circuit is further configured to restrict operation of the proxy device with relation to the client device based on the one or more operating constraints.

56. A non-transitory machine-readable medium having one or more instructions for authenticating a proxy device at a client device, which when executed by a processor causes the processor to:

obtain a shared secret key that can be used by a host device to authenticate communications with the client device having the same shared secret key;

obtain a key derivation function known to both the client device and host device;

obtain one or more operating constraints that restrict operation of the client device relative to the proxy device;

receive an authenticated message at the client device from the proxy device;

generate a local proxy key using the key derivation function, the one or more operating constraints, and the shared secret key; and authenticate the proxy device at the client device by using the local proxy key to verify the received authenticated message.

57. The non-transitory machine-readable medium of claim 56, wherein the one or more operating constraints limit operations the proxy device may perform on the client terminal.

58. The non-transitory machine-readable medium of claim 57 further having one or more instructions which when executed by a processor causes the processor to:

restrict operation of the proxy device with relation to the client device based on the one or more operating constraints.

59. The non-transitory machine-readable medium of claim 56 wherein the proxy device is authenticated if the received authenticated message is properly authenticated by using the local proxy key.

\* \* \* \* \*